United States Patent
Mills et al.

(10) Patent No.: US 8,847,535 B2
(45) Date of Patent: Sep. 30, 2014

(54) SYSTEM AND METHOD TO DETERMINE THE OPERATING STATUS OF AN ELECTRICAL SYSTEM HAVING A SYSTEM CONTROLLER AND AN ACTUATOR CONTROLLER

(75) Inventors: Robert Duane Mills, South Lyon, MI (US); Jeffrey Michael Carpenter, Canton, MI (US)

(73) Assignee: Autoliv ASP, Inc., Ogden, UT (US)

( * ) Notice: Subject to any disclaimer, the term of this patent is extended or adjusted under 35 U.S.C. 154(b) by 99 days.

(21) Appl. No.: 13/291,686

(22) Filed: Nov. 8, 2011

(65) Prior Publication Data

US 2013/0113406 A1 May 9, 2013

(51) Int. Cl.
*H02P 3/06* (2006.01)
*B60L 3/00* (2006.01)

(52) U.S. Cl.
CPC .................................. *B60L 3/0023* (2013.01)
USPC ............................... 318/454; 701/21; 700/21

(58) Field of Classification Search
None
See application file for complete search history.

(56) References Cited

U.S. PATENT DOCUMENTS

| | | | | |
|---|---|---|---|---|
| 4,583,090 A * | 4/1986 | Eden et al. | ...................... | 375/272 |
| 5,481,194 A * | 1/1996 | Schantz et al. | ................. | 324/522 |
| 5,508,594 A * | 4/1996 | Underwood et al. | ......... | 318/139 |
| 6,390,565 B2 * | 5/2002 | Riddiford et al. | ................. | 303/3 |
| 6,398,319 B1 * | 6/2002 | Wilson et al. | ............ | 303/122.03 |
| 6,484,833 B1 * | 11/2002 | Chhaya et al. | ........... | 180/65.225 |
| 6,665,596 B2 * | 12/2003 | Bauer et al. | ...................... | 701/36 |
| 6,684,146 B1 * | 1/2004 | Hedenetz | ......................... | 701/70 |
| 6,885,922 B2 * | 4/2005 | Yao et al. | ...................... | 701/32.9 |
| 6,935,449 B2 * | 8/2005 | Chernoff et al. | ............. | 180/65.1 |
| 6,985,343 B2 * | 1/2006 | Mirowski et al. | ............. | 361/93.2 |
| 6,985,848 B2 * | 1/2006 | Swoboda et al. | ............... | 703/26 |
| 7,305,292 B2 * | 12/2007 | Lohner et al. | ................... | 701/41 |
| 7,319,907 B2 * | 1/2008 | Kasdan et al. | .................. | 700/20 |
| 7,630,807 B2 | 12/2009 | Yoshimura et al. | | |
| 8,099,179 B2 * | 1/2012 | Naik et al. | ...................... | 700/21 |
| 8,145,358 B2 * | 3/2012 | Miller | ........................... | 700/281 |
| 8,484,736 B2 * | 7/2013 | Hahn et al. | ...................... | 726/24 |
| 2003/0043739 A1 * | 3/2003 | Reinold et al. | ................ | 370/228 |
| 2005/0043859 A1 * | 2/2005 | Tsai et al. | ..................... | 700/286 |
| 2006/0004588 A1 * | 1/2006 | Ananda | ............................. | 705/1 |
| 2006/0253726 A1 * | 11/2006 | Kukshya et al. | .................. | 714/4 |
| 2009/0207178 A1 * | 8/2009 | Azar et al. | ..................... | 345/502 |
| 2010/0114422 A1 | 5/2010 | Weichenberger | | |

FOREIGN PATENT DOCUMENTS

JP     2010146367 A  *  7/2010

OTHER PUBLICATIONS

Mercedes-Benz Power Point Presentation, "Sensotronic Brake Control (SBC)," Mar. 5, 2004.

* cited by examiner

*Primary Examiner* — John R Olszewski
*Assistant Examiner* — Jean-Paul Cass
(74) *Attorney, Agent, or Firm* — Brinks Gilson & Lione

(57) ABSTRACT

A system and method to determine the operating status of an electrical system includes a system controller and an actuator controller. The system controller determines if the actuator controller is operating properly and initiates a safe mode of operation if the actuator is not operating properly. In turn, the actuator controller determines if the system controller is operating properly and initiates a safe mode of operation if the system controller is not operating properly.

14 Claims, 3 Drawing Sheets

SYSTEM AND METHOD TO DETERMINE THE OPERATING STATUS OF AN ELECTRICAL SYSTEM HAVING A SYSTEM CONTROLLER AND AN ACTUATOR CONTROLLER

BACKGROUND

1. Subject Matter of the Invention

The invention relates to system and methods for determining the operating status of an electrical system having a system controller and an actuator controller.

2. Description of the Known Art

Vehicles, such as automobiles, have a variety of passive and active safety systems protecting the occupants of the vehicle if the vehicle is involved in a collision. Active safety systems work to prevent accidents; they selectively actuate controllers that assist the driver in steering and braking the automobile to help prevent accidents. If the controllers are not operating properly, they can degrade the ability for the driver to control the automobile, which may lead to an accident.

Prior art solutions generally utilize a single electronic control unit for processing signals and controlling actuation. This relies on a single electronic control unit to failsafe itself by cross checking its control and signals. This electronic control unit typically will contain additional logic to make sure it is operating properly. This logic can become quite complex because the electronic control unit is often the only system processing this information in this context and relies on self-checks to insure proper operation.

Further objects, features and advantages of this invention will become readily apparent to persons skilled in the art after a review of the following description, with reference to the drawings and claims that are appended to and form a part of this specification.

SUMMARY

A system and method to determine the operating status of an electrical system includes a system controller and an actuator controller. Generally, the system controller determines if the actuator controller is operating properly and initiates a safe mode of operation if the actuator is not operating properly. In turn, the actuator controller determines if the system controller is operating properly and initiates a safe mode of operation if the system controller is not operating properly.

In order to determine if the system controller is operating properly, the system controller generates a system key and transmits the system key from the system controller to the actuator controller. The actuator controller then determines if the system key is an expected system key value. If the system key is not an expected system key value, the actuator controller will ignore commands from the system controller.

In order for the system controller to determine if the actuator controller is operating properly, the actuator controller first generates an actuator key, which may be based in part on the system key generated by the system controller. Thereafter, the actuator key is transmitted from the actuator controller to the system controller, wherein a determination is made by the system controller if the actuator key is an expected actuator key value. If the actuator key is not an expected actuator key value, the actuator controller will be disabled, which may include removing power from the actuator controller.

Further objects, features and advantages of this invention will become readily apparent to persons skilled in the art after a review of the following description, with reference to the drawings and claims that are appended to and form a part of this specification.

DETAILED DESCRIPTION

Figure 1:
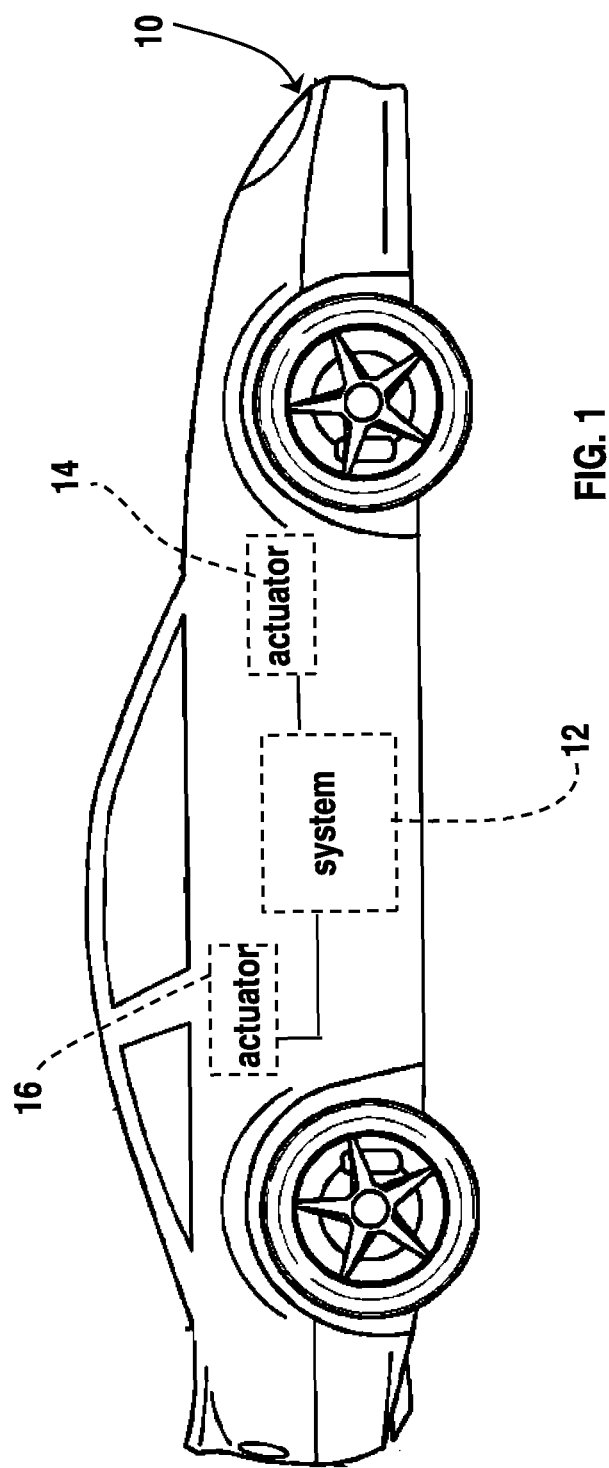
FIG. 1 illustrates a vehicle having a system to determine the operating status of an electrical system having both a system controller and an actuator controller.

Referring to FIG. 1, a vehicle 10 incorporating a system 12 for determining the operating status of both a system controller and actuator controller is shown. The system 12 includes an actuator control system which actuates an actuator, which may be a vehicle safety system. For example, the actuator may be a steering system or brake system 14 or an occupant restraint system 16, such as a pretension device for a vehicle safety belt system.

While the illustration of FIG. 1 shows the vehicle 10 as being an automobile, it should be understood that the system 12 can be incorporated in any number of different variations of vehicles capable of transporting occupants from one place to another. For example, the vehicle 10 may be a truck, car, sport utility vehicle, or construction/farming vehicle. Additionally, it should be understood that the system 12 could be equally incorporated in systems beyond those that are found in land based vehicles, such as aircraft and water craft. Finally, the system could be incorporated in devices that are not vehicles at all, such as medical equipment or consumer electronics.

Figure 2:
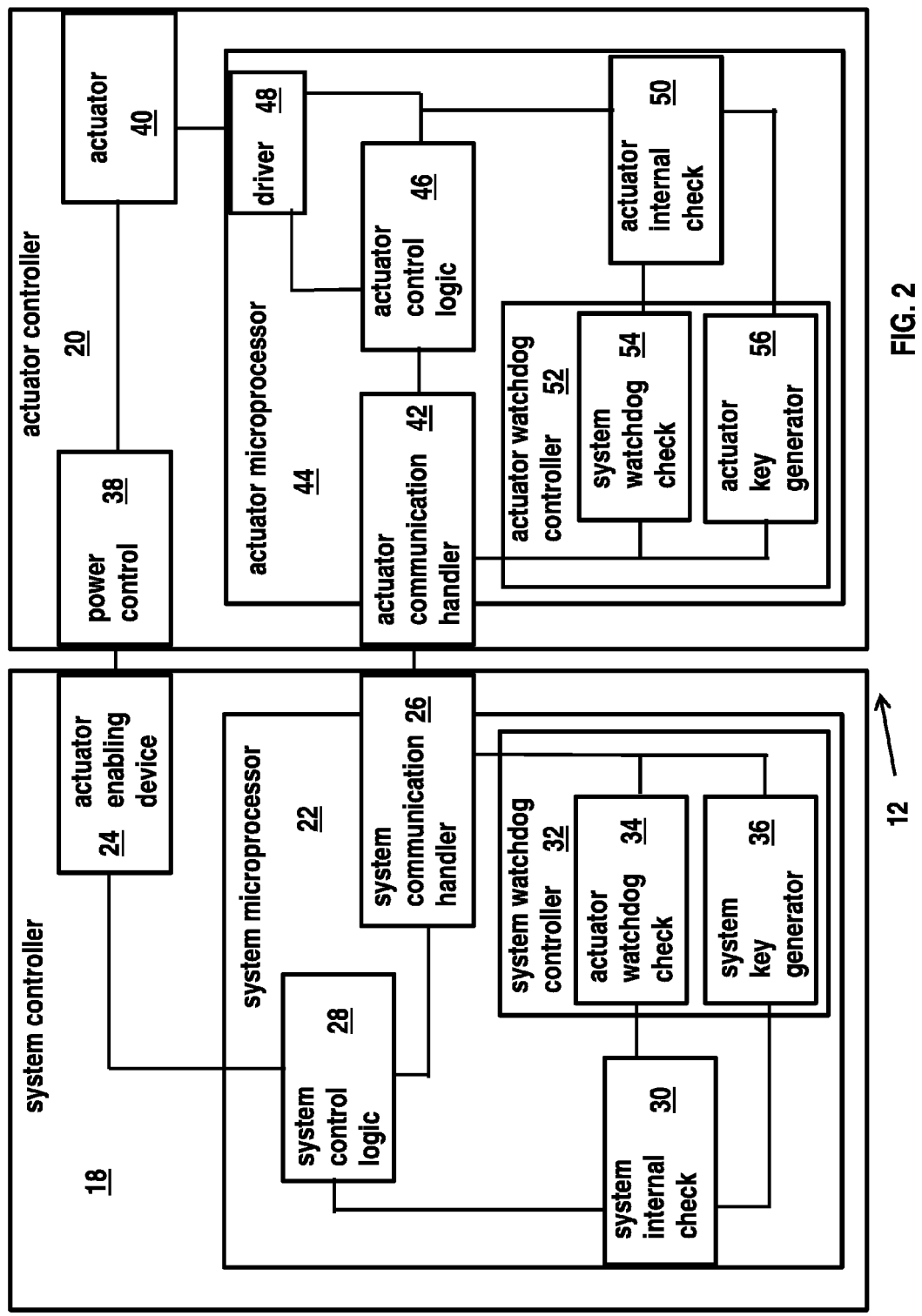
FIG. 2 is a more detailed illustration of the system for determining the operating status of an electrical system having both a system controller and an actuator controller.

Referring to FIG. 2, a more detailed illustration of the system 12 is shown. As its primary components, the system 12 includes a system controller 18 and an actuator controller 20. The system controller 18 generally includes a system microprocessor 22. The system microprocessor 22 is in electrical communication with an actuator enabling device 24 and a system communication handler 26. The actuator enabling device 24 is configured to send a signal to the actuator controller 20 to either enable or disable the actuator controller 20. The system communication handler 26 is configured to transmit signals from the system microprocessor 22 to the actuator controller 20.

The system microprocessor 22 further includes a system control logic 28, a system internal check 30 and a system watchdog controller 32. The system control logic 28 is in communication with both the system communication handler 26 and the system internal check 30. The system control logic 28 is configured to provide a series of control signals that will eventually be sent to the actuator controller 20. In addition, the system control logic 28 is used to determine when to actuate a vehicle safety system, such as a steering system or brake system, by actuating an actuator controlled by the actuator controller 20.

The system watch dog controller includes an actuator watchdog check 34 and a system key generator 36. The actuator watchdog check 34 receives an actuator key from the actuator controller 20 and determines if the actuator controller 20 is operating properly, as will be described in more detail in the paragraphs that follow. The system key generator 36 performs the function of generating a system key which will be eventually sent to the actuator controller 20, so that the actuator controller 20 can confirm that the system controller 18 is operating properly.

The system key may be based on system checks of the system control logic 28 and/or the system microprocessor 22, which may include read-only memory, a random access memory, or an arithmetic logic unit. Further, the system key value may be based in part on the actuator key generated by the actuator controller 20. The system controller watchdog 32 also provides actuator watchdog status to the system internal check 30 as part of the overall logic tests.

The actuator watchdog check 34, after receiving the actuator key value, will make a determination if the actuator key value is the expected actuator key value. Generally, the actuator key value may be based on a system rate of the actuator controller 20, system checks of a logic unit of the actuator controller 20, wherein the logic unit of the actuator controller 20 may be a read-only memory, a random access memory, or an arithmetic logic unit. Additionally, as will be explained later, the actuator key value may be based in part on the system key value generated by the system key generator 36.

In either case, the actuator watchdog check 34 will send a signal to the system internal monitor 30, which will then relay the signal to the system control logic 28. From there, the system control logic 28 will communicate with the actuator enabling device 24, which can then disable the actuator controller 20 if the actuator key value is not the expected actuator key value. This disabling of the actuator controller 20 may include not sending any signals to the actuator or may include powering off of the actuator controller 20.

The actuator controller 20 includes a power control 38, an actuator 40, an actuator communication handler 42, and an actuator microprocessor 44. The actuator microprocessor 44 is in communication with the actuator communication handler 42 which communicates with the system controller communication handler 26. The actuator microprocessor 44 is also in communication with the actuator 40. Essentially, the actuator microprocessor can activate or deactivate the actuator 40. The power control 38 provides power to the actuator 40, allowing the actuator 40 to activate or deactivate based on signals received from the actuator microprocessor 44.

The actuator microprocessor 44 includes an actuator control logic 46, a driver 48, an actuator internal check 50, and an actuator controller watchdog 52. The driver 48 is in communication with the actuator control logic 46 and receives signals from the actuator control logic 46 to provide a signal to the actuator 40, thereby activating or deactivating the actuator 40. As stated before, the actuator 40 may interact with the safety device such as a steering system or brake system 14 of FIG. 1.

The actuator controller watchdog 52 includes a system watchdog check 54 and an actuator key generator 56. The system watchdog check 54 receives the system key from the system controller 18 and determines if the system key is the expected system key. The actuator key generator 56 generates an actuator key which is then provided to the communication handler 42 of the actuator controller 20. The actuator key may be based on system checks of the actuator control logic 46 and/or the actuator microprocessor 44 which may include read-only memory, a random access memory, or an arithmetic logic unit. Further, the actuator key value may be based in part on the system key generated by the system controller 18. The actuator controller watchdog 52 also provides system watchdog status to actuator internal check 50 as part of the overall logic tests.

The actuator internal check 50 receives information from the system watchdog check regarding if the system is operating properly based on a previous determination if the received system key is the expected system key. If the actuator internal check 50 receives information from the system watchdog check 54 that the system controller 20 is operating properly, the actuator internal check 50 then enables the driver 48 and the actuator control logic 46, by informing the driver 48 and the actuator control logic 46 that the system controller 20 is operating properly. After the determination is made by the actuator controller watchdog 52 that the system controller 20 is not operating properly, the actuator controller can communicate to the actuator control logic 46 via the actuator internal check 50 of the status. In case that the system controller 18 is not operating properly, the actuator controller 20 can simply ignore commands from the system controller 18, as the system controller 18 is not operating properly.

Figure 3:
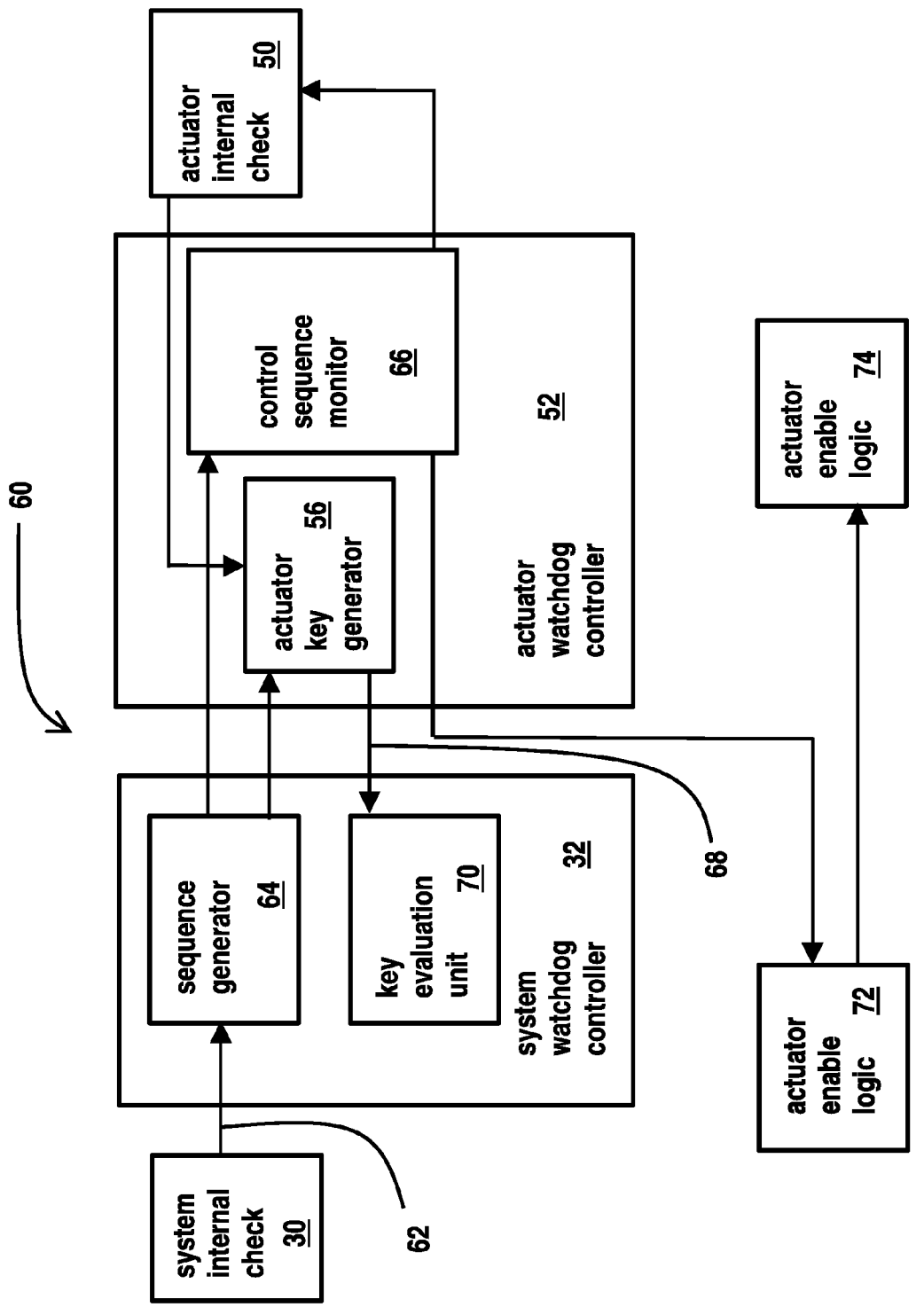
FIG. 3 illustrates a functional diagram of the method to determining the operating status of the electrical system having both a system controller and an actuator controller of FIG. 2.

Referring to FIG. 3, a flow diagram 60 of the method for determining the operating status of an electrical system is shown. It should be understood that the method 60 is shown in a flow chart form but makes reference to components previously mentioned in FIG. 2.

The method 60 includes the system watchdog controller 32 and the actuator watchdog controller 52. The system internal monitor 30 sends a monitor status signal 62 to a sequence generator 64 (which is the same as key generator 36). The sequence generator 64 creates the system key value and provides a system key value to the actuator key generator 56 and a control sequence monitor 66 (which is the same as system watchdog check 54) of the actuator watchdog controller 52. The system watchdog check is accomplished by the checking the sequence of keys. Thereafter, the actuator key generator 56 sends an actuator key value 68 to the key evaluation unit 70 (which is the same as watchdog check 34) that verifies the correct actuator key value was generated from the system key, essentially using the system key value as a seed value.

The controller key sequence monitor 66 determines if the system controller key value is the expected system controller key value and sends signals to the actuator internal monitor 50 which then relays monitor status information to the actuator key generator 56 and an actuator enable logic 72. The actuator enable logic 72 then sends a signal to an actuator enable logic 74, enables the actuator 40.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of the invention. This description is not intended to limit the scope or application of the invention in that the invention is susceptible to modification, variation and change, without departing from spirit of the invention, as defined in the following claims.

The invention claimed is:

1. A method to determine an operating status of an electrical system having a system controller configured to send commands to several actuator controllers subordinate to the system controller, each of the several actuator controllers controlling an actuator of a vehicle, the method comprising the steps of:
   generating a system key by the system controller for the several actuator controllers;
   transmitting the system key from the system controller to a respective one of the several actuator controllers;
   evaluating the system key by the respective one of the several actuator controllers to determine whether the system controller is operating properly or improperly;
   initiating a first safe mode operation upon determining by the respective one of the actuator controllers that the system controller is operating improperly, the first safe mode operation causing the respective one of the several actuator controllers to ignore all subsequent commands received from the system controller while allowing the system controller continues to send new commands to the respective one of the several actuator controller controllers;
   generating an actuator key by the actuator controller;
   transmitting the actuator key from the actuator controller to the system controller upon
determining that the system controller is operating properly;
   comparing the actuator key by the system controller with an expected actuator key value;
determining by the system controller that the actuator controller is operating improperly upon determining that the actuator key is an unexpected actuator key value; and
   initiating a second safe mode operation upon determining that the actuator controller is operating improperly, the second safe mode operation causing the system controller to remove power from the actuator controller.

2. The method of claim 1 further comprising the steps of:
   comparing, by the actuator controller, the system key with an expected system key value; and
   initiating the first safe mode upon determining that system key is an unexpected system key value.

3. The method of claim 1, wherein the actuator key value is based on a system rate of the actuator controller.

4. The method of claim 1, wherein the actuator key value is based on system checks of at least one logic unit of the actuator controller.

5. The method of claim 4, wherein the at least one logic unit of the actuator controller is a read only memory, a random access memory, or an arithmetic logic unit.

6. The method of claim 1, further comprising the steps of:
   comparing, by the system controller, a rate at which the actuator key was generated with an expected rate; and
   removing power from the actuator controller upon determining that the actuator key was generated at an unexpected rate.

7. The method of claim 2, further comprising the step of transmitting from the actuator controller to the system controller information regarding an operating state of the system controller.

8. The method of claim 2, wherein the system key value is based on a system rate of the system controller.

9. The method of claim 2, wherein the system key value is based on system checks of at least one logic unit of the system controller.

10. The method of claim 9, wherein the at least one logic unit of the system controller is a read only memory, a random access memory, or an arithmetic logic unit.

11. The method of claim 2, further comprising the steps of:
    comparing, by the actuator controller, a rate at which the system key was generated with an expected rate; and
    ignoring commands from the system controller by the actuator controller upon determining that the system key was generated at an unexpected rate.

12. The method of claim 11, further comprising the step of transmitting from the actuator controller to the system controller information regarding an operating state of the system controller.

13. The method of claim 2, further comprising the steps of:
    determining by the actuator controller if the system controller is capable of determining if the actuator key is the expected actuator key value; and
    ignoring commands from the system controller by the actuator controller upon determining that the system controller is incapable of determining if the actuator key is the expected actuator key value.

14. The method of claim 1, further comprising the steps of:
    determining by the system controller if the actuator controller is capable of determining if the system key is the expected system key value; and
    removing power from the actuator controller upon determining that the actuator controller is incapable of determining if the system key is the expected system key value.

* * * * *